(12) United States Patent
Van Pelt

(10) Patent No.: US 9,789,805 B1
(45) Date of Patent: Oct. 17, 2017

(54) EXPEDITION VEHICLE

(71) Applicant: Michael Van Pelt, Nixa, MO (US)

(72) Inventor: Michael Van Pelt, Nixa, MO (US)

(*) Notice: Subject to any disclaimer, the term of this patent is extended or adjusted under 35 U.S.C. 154(b) by 23 days.

(21) Appl. No.: 15/078,133

(22) Filed: Mar. 23, 2016

Related U.S. Application Data

(63) Continuation of application No. 14/197,009, filed on Mar. 4, 2014, now Pat. No. 9,302,605.

(60) Provisional application No. 61/851,240, filed on Mar. 4, 2013, provisional application No. 61/854,702, filed on Apr. 29, 2013.

(51) Int. Cl.
*B62D 33/06* (2006.01)
*B60P 3/38* (2006.01)
*B62D 33/077* (2006.01)
*B62D 24/04* (2006.01)

(52) U.S. Cl.
CPC ............. *B60P 3/38* (2013.01); *B62D 24/04* (2013.01); *B62D 33/0612* (2013.01); *B62D 33/077* (2013.01)

(58) Field of Classification Search
CPC ..... B60P 3/38; B62D 33/0612; B62D 33/077; B62D 24/04
USPC ........................................................ 296/165
See application file for complete search history.

(56) References Cited

U.S. PATENT DOCUMENTS

| | | |
|---|---|---|
| 3,582,129 A | 6/1971 | Frank ............................. 296/23 |
| 3,638,991 A * | 2/1972 | Hathaway, Jr. ........... B60P 3/36 105/18 |
| 3,823,974 A | 7/1974 | Patnode ......................... 296/23 |
| 3,844,603 A | 10/1974 | Bjork et al. ................... 296/166 |
| 3,941,415 A | 3/1976 | Cooper ........................... 296/27 |
| 4,157,201 A * | 6/1979 | Collins ..................... B60P 3/32 296/156 |
| 4,220,370 A | 9/1980 | Rice .............................. 296/165 |
| 4,351,554 A | 9/1982 | Miller ....................... 296/190.02 |
| 4,378,856 A | 4/1983 | Miller ......................... 180/89.14 |
| 5,100,196 A | 3/1992 | Dodgen ......................... 296/156 |
| 5,108,144 A | 4/1992 | Crowley ....................... 296/165 |
| 5,280,984 A * | 1/1994 | Paul ....................... B60D 5/006 296/1.06 |
| 5,560,673 A | 10/1996 | Angelo ....................... 296/26.02 |
| 5,961,176 A | 10/1999 | Tilly ............................. 296/165 |
| 6,325,447 B1 | 12/2001 | Kuo ............................. 296/165 |
| 6,966,590 B1 | 11/2005 | Ksiezopolski et al. .... 296/26.01 |
| D522,922 S | 6/2006 | Swails et al. ................. D12/103 |
| D574,315 S | 8/2008 | Swails et al. ................. D12/401 |
| 8,366,168 B1 | 2/2013 | Ksiezopolski et al. .... 296/26.01 |

(Continued)

FOREIGN PATENT DOCUMENTS

DE 101 04 529 8/2002 ............... B60P 3/34

*Primary Examiner* — Pinel Romain
(74) *Attorney, Agent, or Firm* — Jonathan A. Bay

(57) ABSTRACT

A motorized expedition vehicle has a truck cab, an engine and riding gear package, and a cabin. The cabin can serve any as a living, camping or office area. The wherein the cabin is expandable and collapsible between expanded and collapsed extremes. To do this, the cabin has an openable rectangular box structure. Namely, there is a rectangular and open-topped lower-sidewall/floor portion, a rectangular and open-bottomed upper-sidewall/roof portion, and one more rectangular-hoop shaped, intermediate sidewall sections. A crawlspace hatchway is formed between the cabin and cab.

9 Claims, 21 Drawing Sheets

(56) References Cited

U.S. PATENT DOCUMENTS

| | | | |
|---|---|---|---|
| 2004/0075239 A1* | 4/2004 | Call | B62D 47/025 |
| | | | 280/403 |
| 2007/0096505 A1 | 5/2007 | Haack | 296/165 |
| 2013/0221696 A1 | 8/2013 | Quattrocolo et al. | 296/24.3 |

* cited by examiner

EXPEDITION VEHICLE

CROSS-REFERENCE TO RELATED APPLICATION(S)

This application is a continuation of U.S. patent application Ser. No. 14/197,009, filed Mar. 4, 2014; which claims the benefit of U.S. Provisional Application No. 61/851,240, filed Mar. 4, 2013 and U.S. Provisional Application No. 61/854,702, filed Apr. 29, 2013, wherein the foregoing patent disclosures are incorporated herein by this reference thereto.

BACKGROUND AND SUMMARY OF THE INVENTION

The invention relates to bodies and tops for land vehicles and, more particularly, to an expedition vehicle having an expansible and collapsible camper.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 21 shows one bed platform and living area suspended from the open-bottomed upper-sidewall/roof portion of the cabin whereas another bed platform and living area are mounted in the open-topped lower-sidewall/floor portion of the cabin, wherein the two living areas are traversed by spiral staircase (of a half of coil).

DETAILED DESCRIPTION OF THE PREFERRED EMBODIMENTS

FIGS. 1-21 and show a first and second embodiment of an expedition vehicle in accordance with the invention. The expedition vehicle can be reckoned as comprising a cab, a chassis, and a camper.

However, it is preferred herein to refer to the camper as a "cabin" instead. Moreover, it is further preferred to refer to the chassis as the an "engine and riding gear package."

Accordingly, an expedition vehicle in accordance with the invention comprises:

a truck cab, an engine and riding gear package, and a cabin comprising a living/office area.

"Cabin" refers to the camper/living/office area.

"Cab" refers to the compartment containing the driver's seat, dashboard and the like. The cab as well as the engine and riding gear package are typically stock items modified with a cabin in accordance with the invention, including any modifications to any of the cab or else the engine and riding gear package. A short list of preferred brands to build upon include without limitation:—

Unimog,

Freightliner,

BAE,

Fuso,
Ford,
International, and so on.

Nevertheless, any of the cab or else the engine and riding gear package are freely modified for purposes of the invention. For instance with the cab, preferred modifications in almost every instance include an inventive hatchway to be described more particularly below, as well as modification of the dashboard to include all the custom controllers for controlling over the custom control systems, to be more particularly described below.

Figure 1:
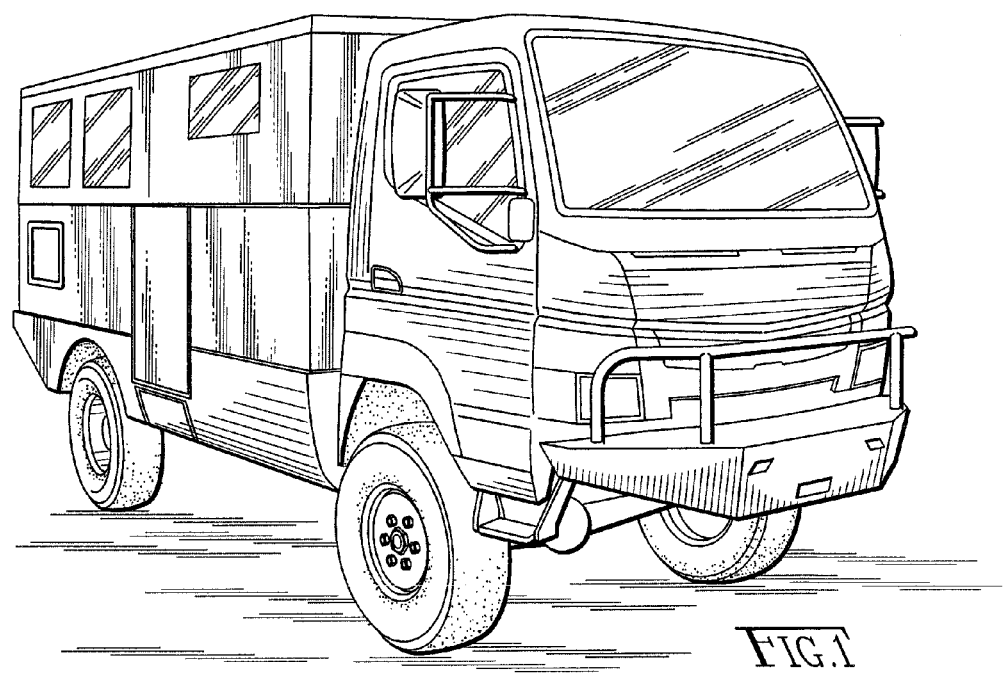
FIG. 1 is a perspective view of an expedition vehicle in accordance with the invention, wherein the cabin therefor is shown in an extreme collapsed position.
Figure 2:
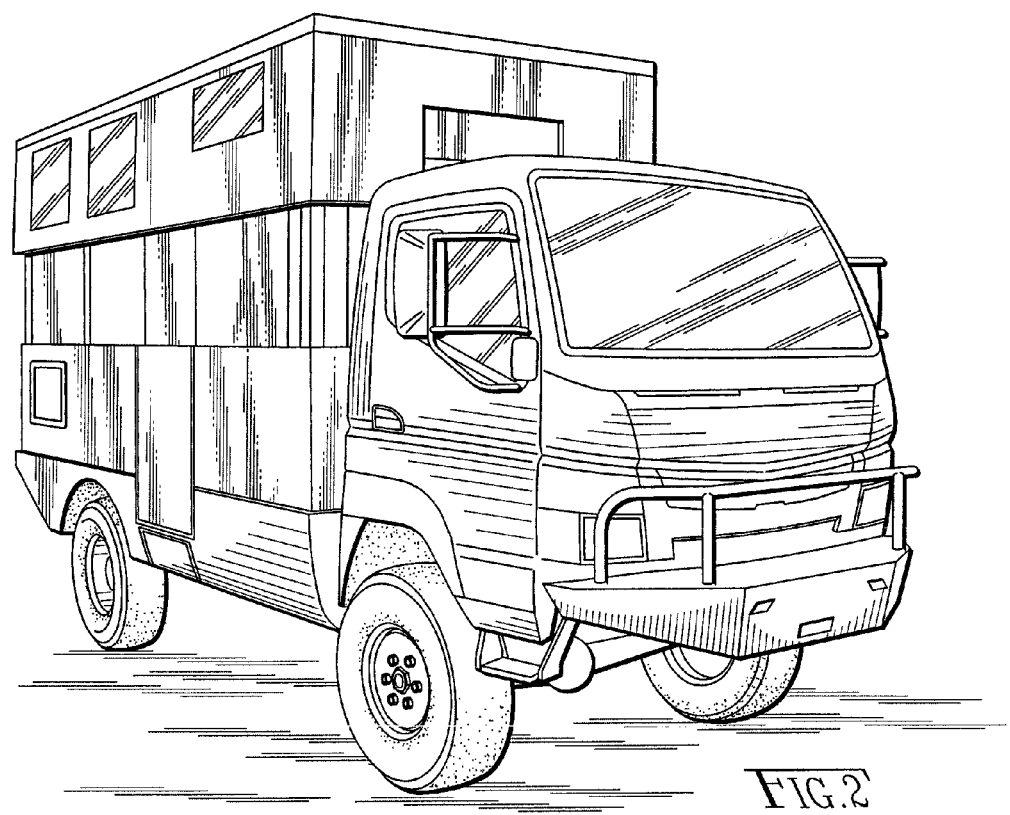
FIG. 2 is a perspective view comparable to FIG. 1 except with the cabin expanded vertically into an extreme expanded position.

FIG. 1 shows the cabin in an extreme collapsed position. FIG. 2 shows the cabin expanded vertically into an extreme expanded position.

Figure 3:
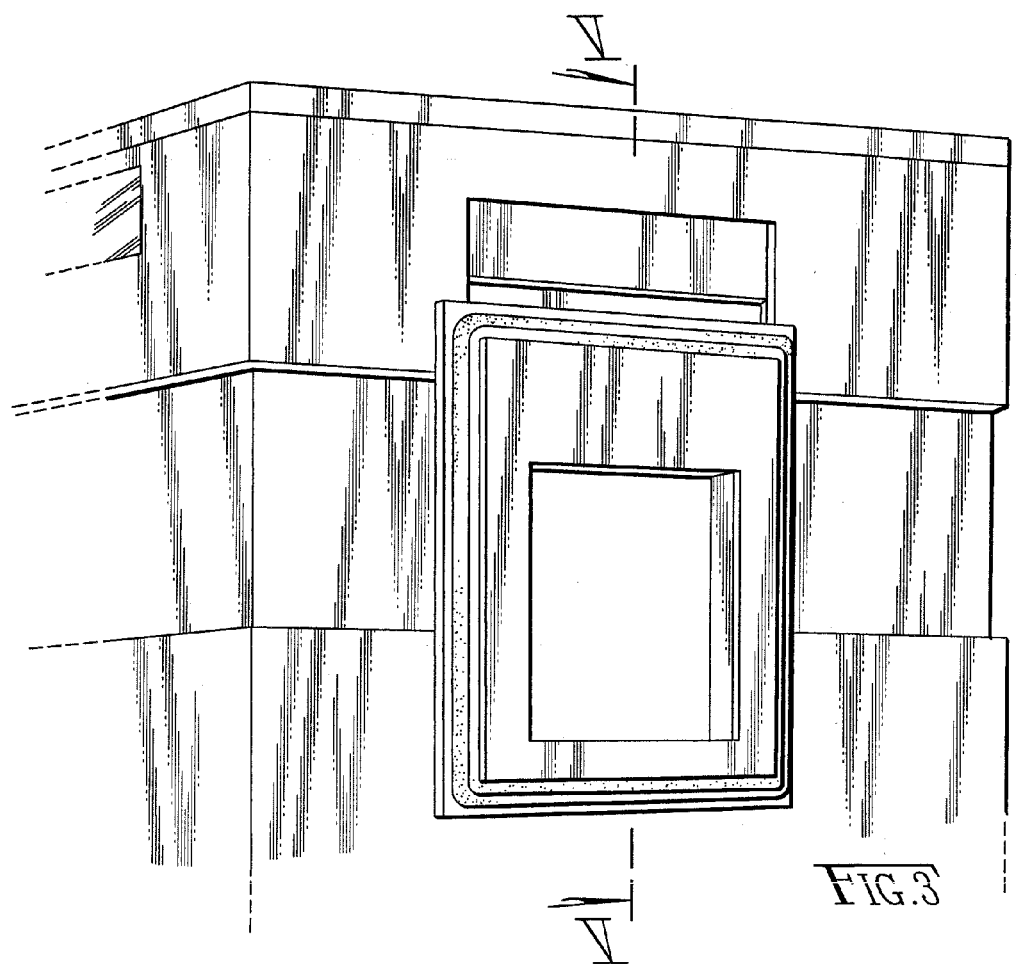
FIG. 3 is a perspective view of the front wall of the cabin, with the cab removed from view, to show a hatchway that provides an open crawlspace (or otherwise passageway) between the cabin and cab, and further shows that open-bottomed upper-sidewall/roof portion of the cabin is only partially extended to the expanded extreme and also has a cut-out in the front wall, which cut-out is filled with a two-panel retractable closure (like a miniature garage door) in order to provide clearance in the collapsing open-bottomed upper-sidewall/roof portion for the hatchway when being retracted to the collapsed extreme.
Figure 4:
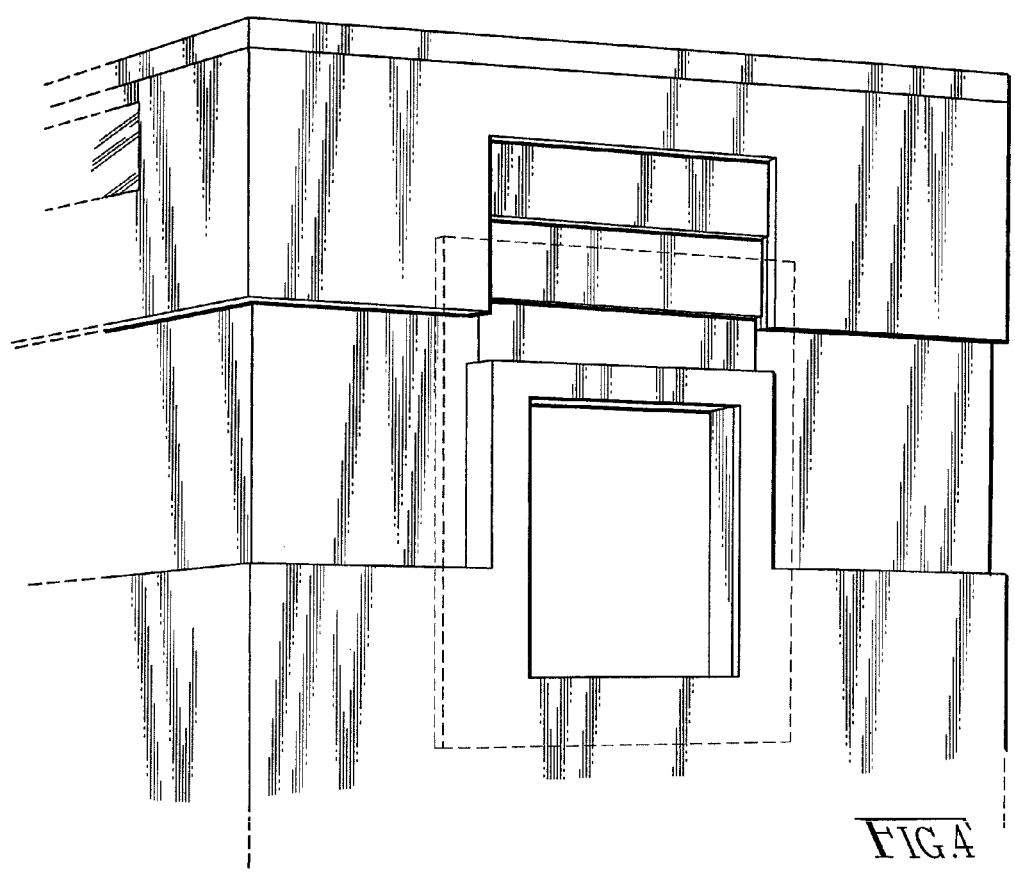
FIG. 4 is a perspective view comparable to FIG. 3 except showing the open-bottomed upper-sidewall/roof portion of the cabin extended to the expanded extreme, showing the two-panel retractable closure filling the void in the cut-out in the open-bottomed upper-sidewall/roof portion of the cabin.

To do this, as FIGS. 3 and 4 show better, the cabin essentially comprises a layered construction of a base, a top cap, and an interconnecting telescopic sections.

More particularly, the cabin has an openable rectangular box structure comprising:
- a rectangular and open-topped lower-sidewall/floor portion,
- a rectangular and open-bottomed upper-sidewall/roof portion, and
- one more rectangular-hoop shaped, intermediate sidewall sections.

The cabin structure can be cycled between collapsed and extended extremes. The intermediate sidewall sections telescope into one or both of the (1) open-topped lower-sidewall/floor portion and/or (2) open-bottomed upper-sidewall/roof portion. (1) The open-topped lower-sidewall/floor portion is vertically stationary during extension and retractions strokes. Conversely, (2) the open-bottomed upper-sidewall/roof portion travels between vertically extended and collapsed extremes during extension and retraction strokes.

When collapsed, the cabin/camper is cab high. That way, the expedition vehicle in accordance with the invention can be driven into a standard international cargo-container and be shipped abroad.

FIGS. 3-6 show better one of the aspects of the invention, namely, a pass through hatchway in the front wall of the cabin that allows person to transit back and forth between the cab and cabin. That is, the cabin has one doorway in a sidewall (ie., the right sidewall) of the cabin. But in addition to the doorway, the cabin has an extra egress, namely, the pass through hatchway.

There is a hatchway between the cab and cabin which is permanently OPEN, inasmuch as, there is no door provision. The hatchway forms a short tube or tunnel. The hatchway is partitioned into one section which is permanently attached to the cabin and another section which is permanently attached to the cab. For suspension purposes, the cab and cabin are allowed to rock laterally on independent arcs from each other, albeit between small-angle angular extremes. Hence the outside walls of the both the cab and cabin are provided with independent face seals, or bulb seals, which form a sealing pressure just by compression therebetween. However, these seals do allow a relative orbital motion relative to each other and maintain sealing pressure. (Could possibly have also used an accordion seal attached by one ring of fasteners to the cab and another to the cabin. However, since the cab for some trucks is meant to pitch up and forward to give mechanics access to the engine, such an accordion seal would have to be undone each time for the engine compartment to be OPENED.)

Hence these face or bulb seals (1) make small oscillations or orbits relative each other given the independent swaying of the cab and cabin, and also (2) flip open with undoing any fasteners when the engine compartment is OPENED.

Figure 5:
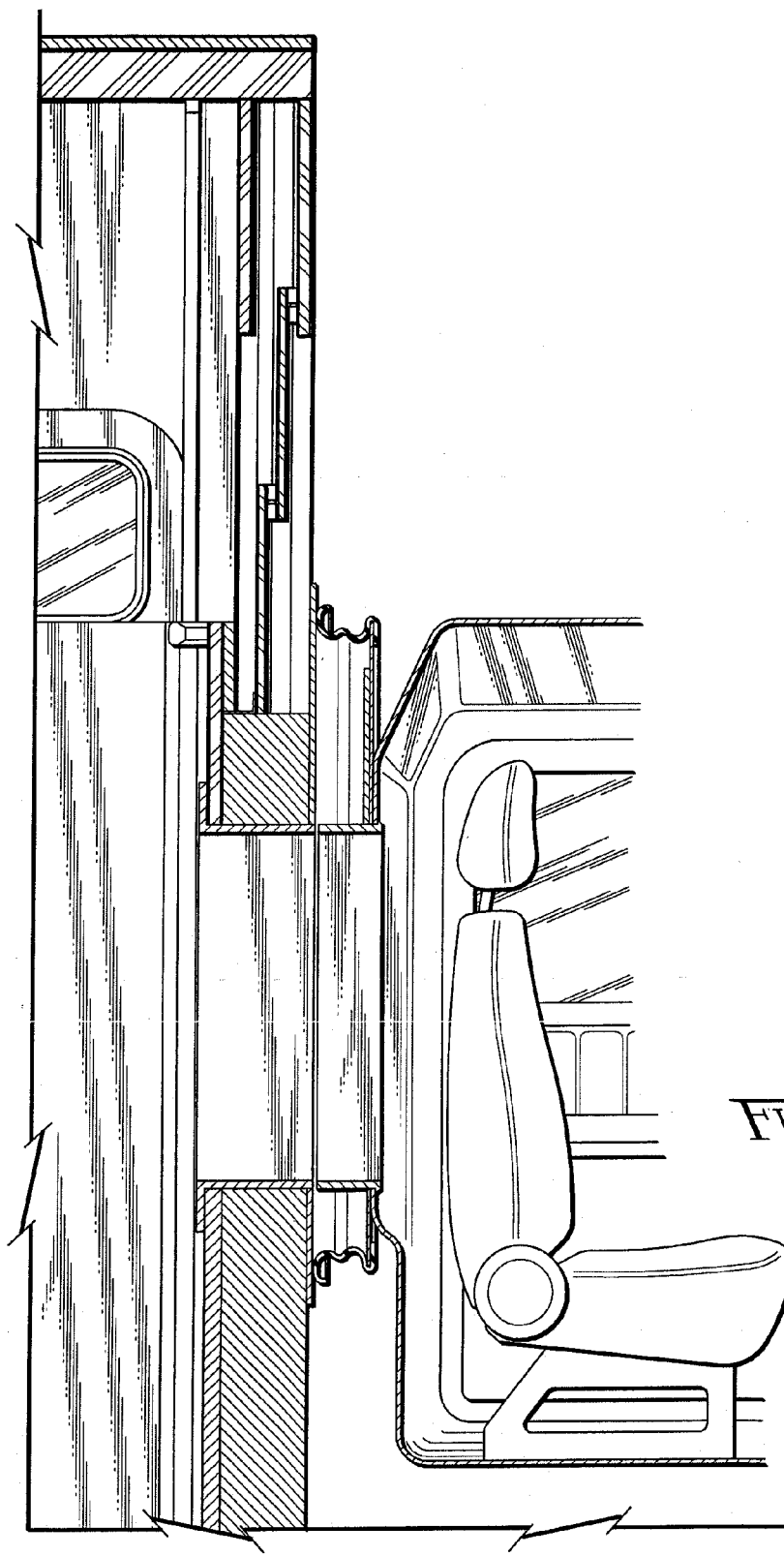
FIG. 5 is an enlarged scale section view taken along line V-V in FIG. 3.
Figure 6:
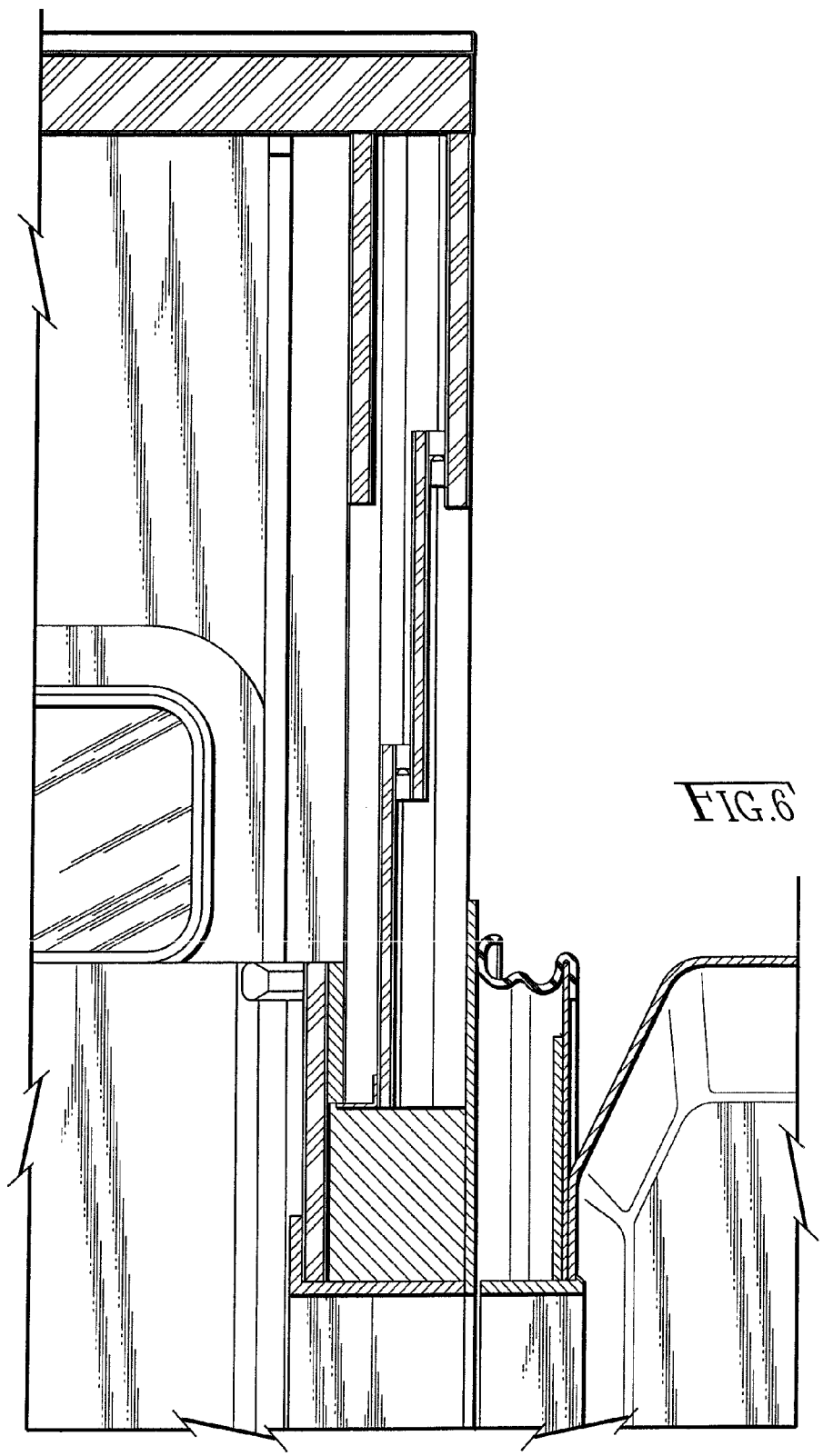
FIG. 6 is an enlarged scale section view detail of the upper half of FIG. 5.
Figure 7:
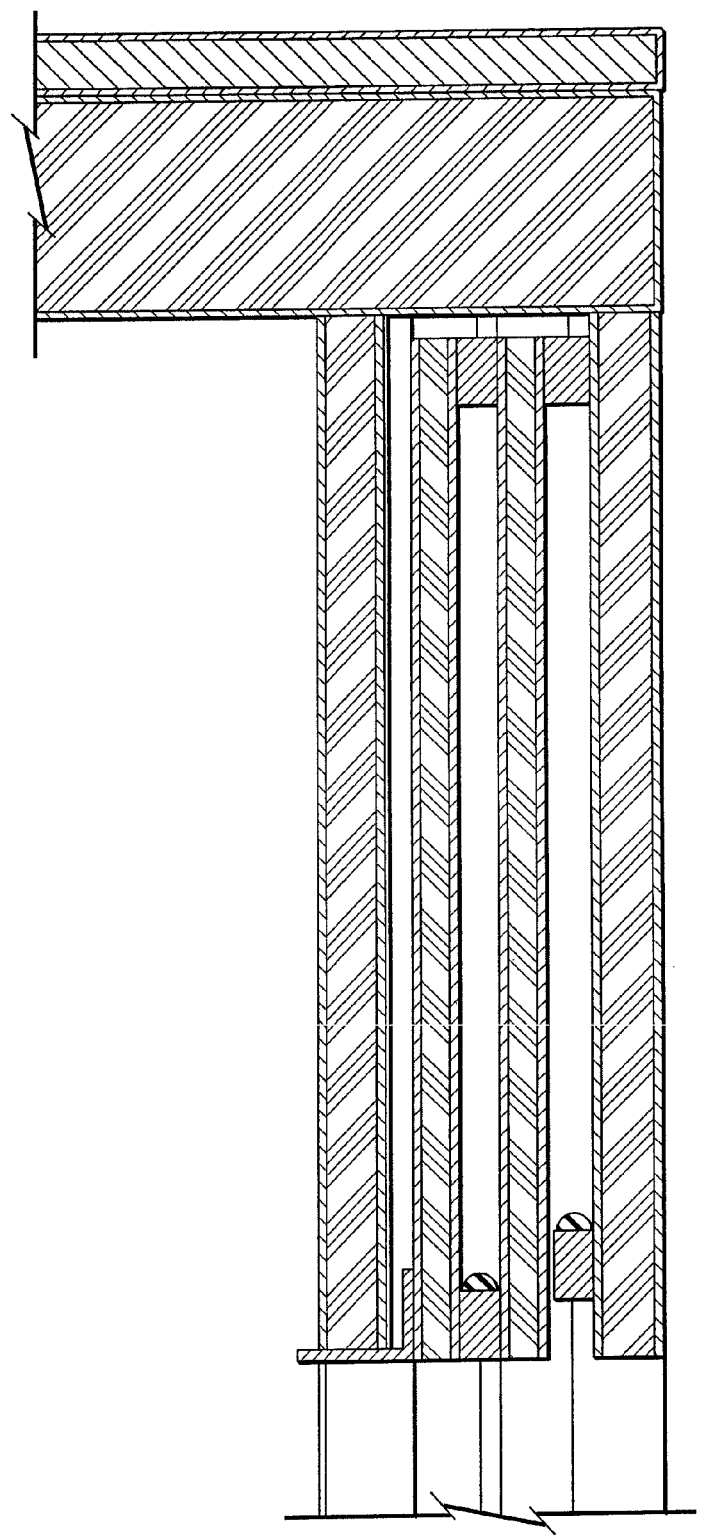
FIG. 7 is a section view comparable to FIG. 6 except showing the two panel closure collapsed.
Figure 8:
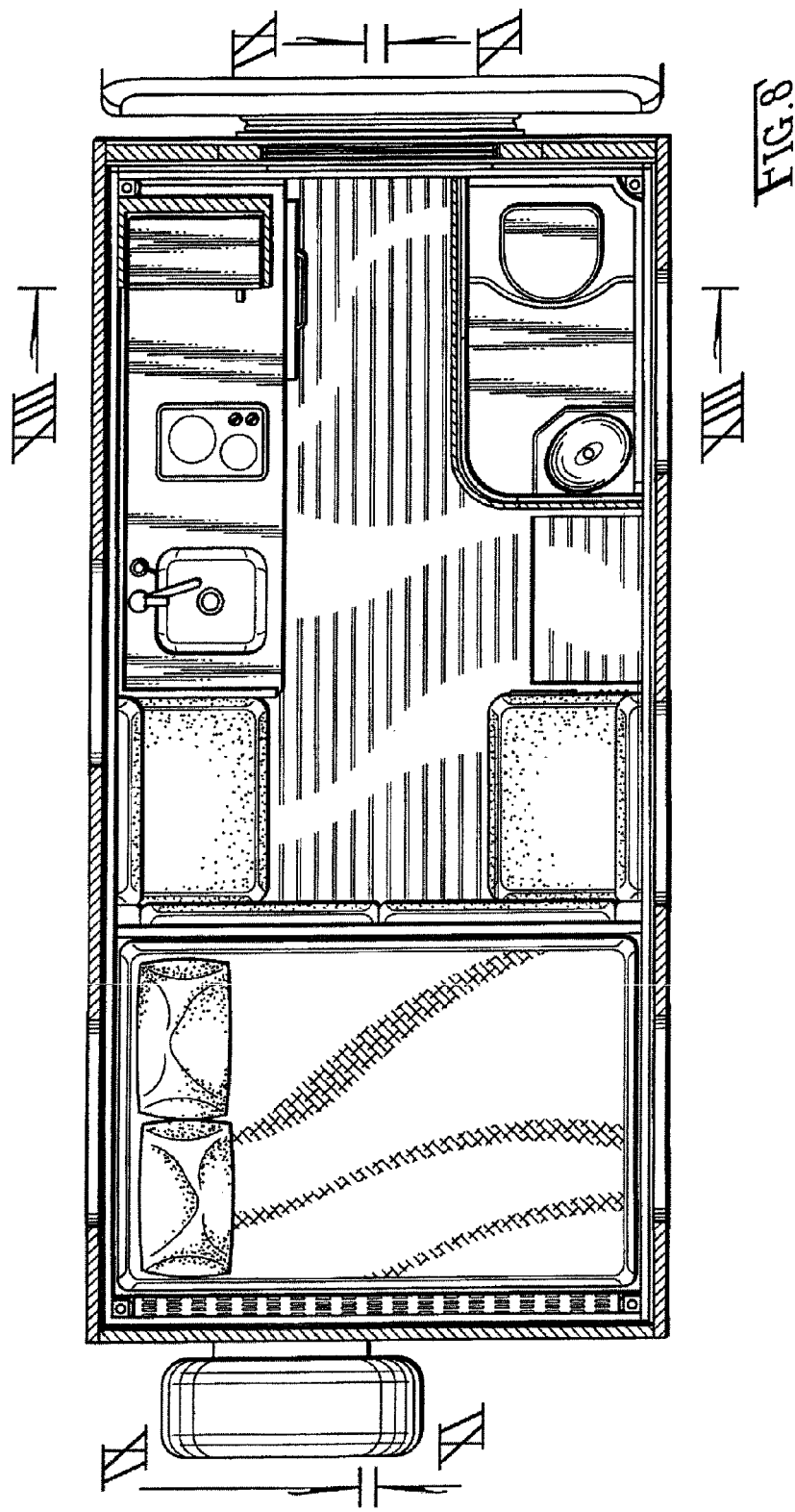
FIG. 8 is plan view of the cabin in FIG. 2 except with the open-bottomed upper-sidewall/roof portion removed from view.
Figure 9:
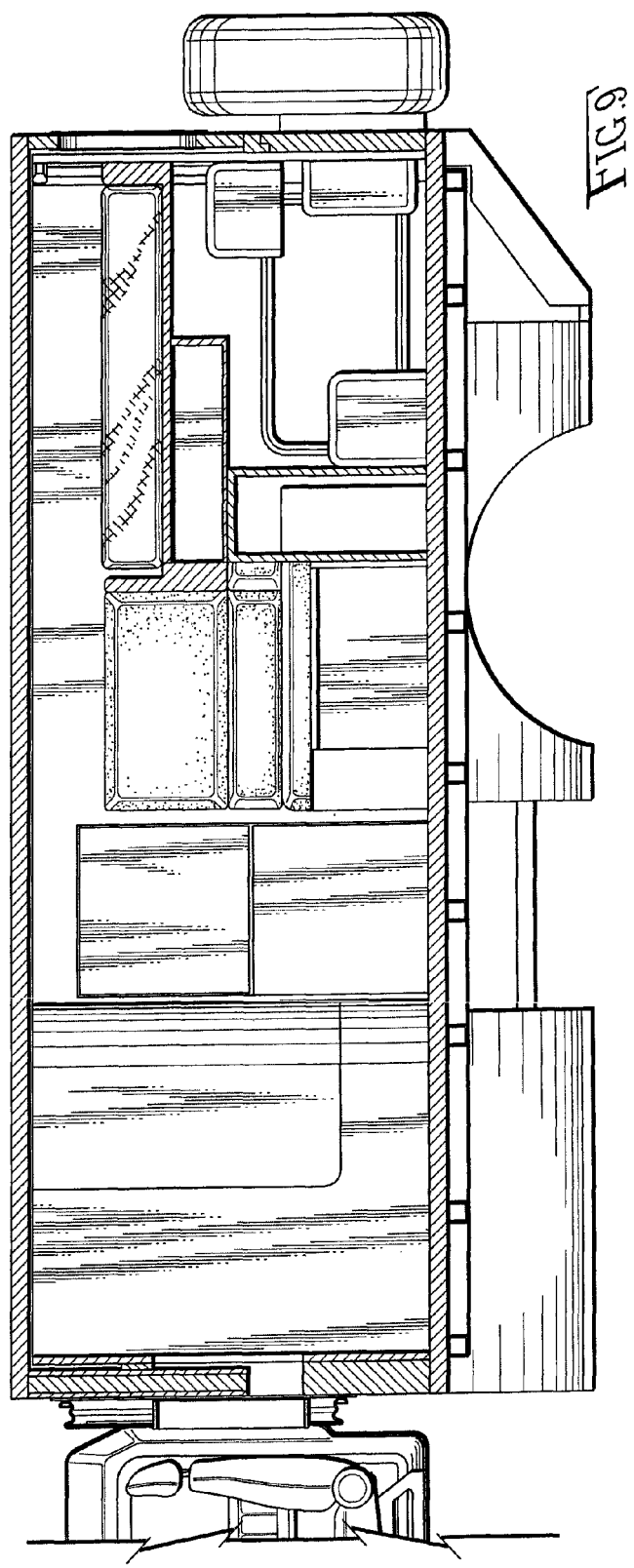
FIG. 9 is an enlarged scale section view taken along line IX-IX in FIG. 8.
Figure 10:
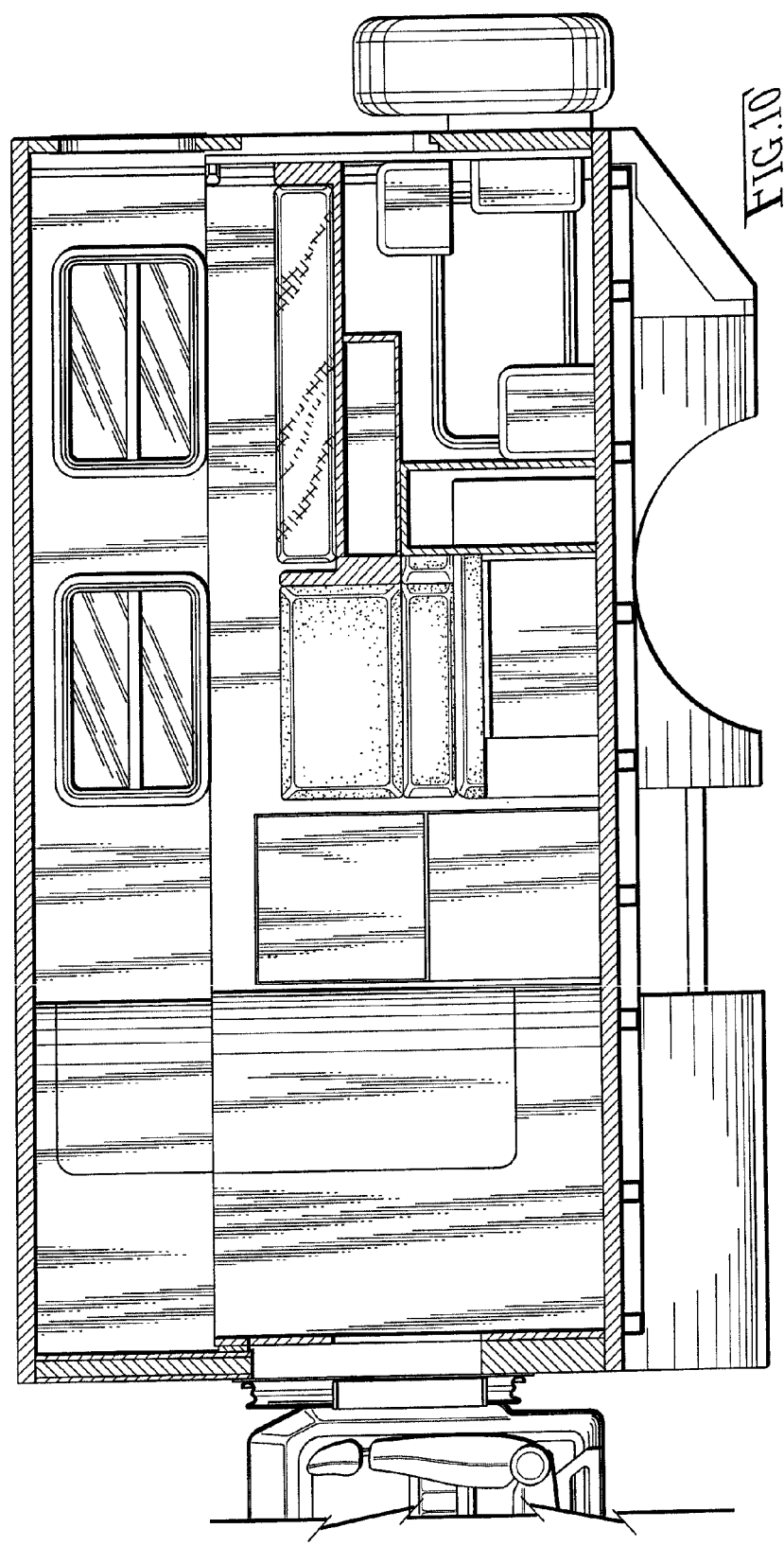
FIG. 10 is a section view comparable to FIG. 9 except showing the cabin expanded (and the spare tire removed from view)
Figure 11:
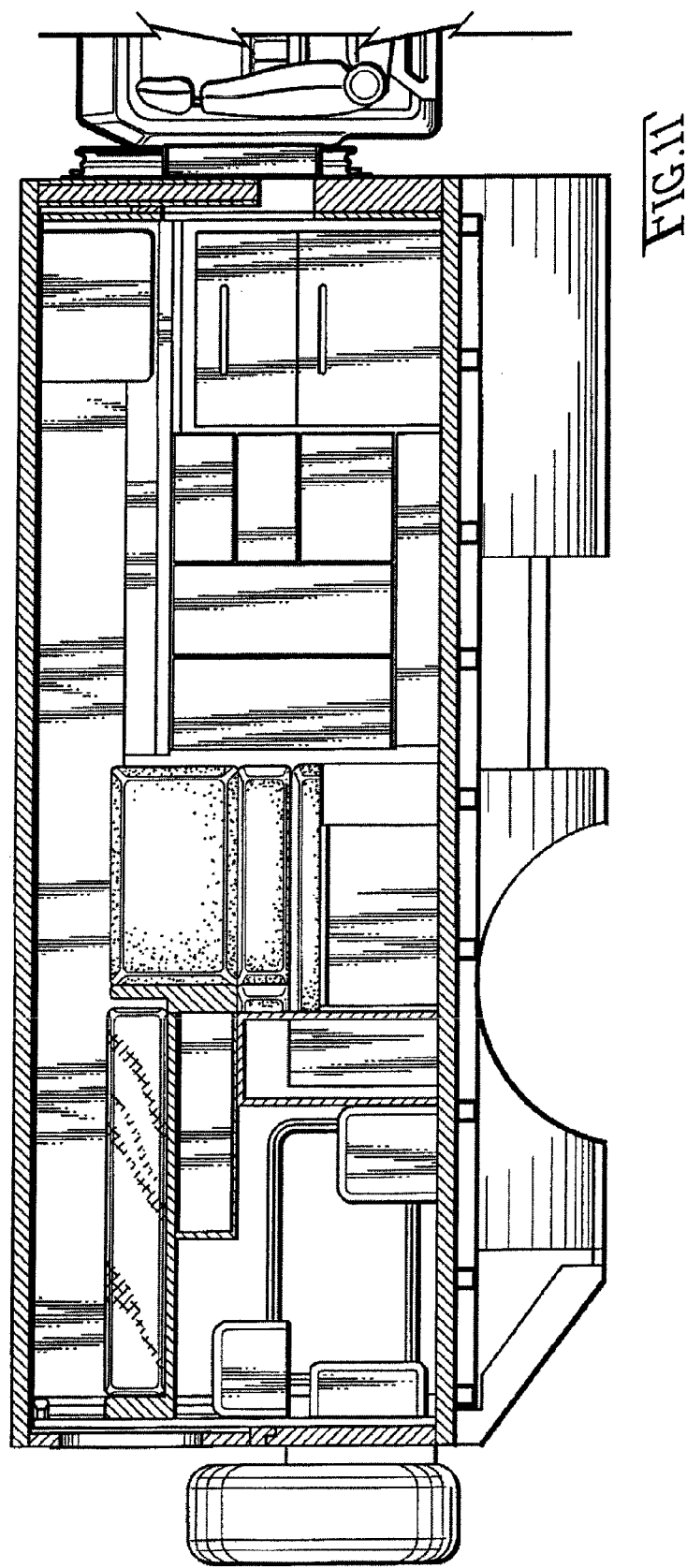
FIG. 11 is an enlarged scale section view taken along line XI-XI in FIG. 8.

FIGS. 5-7 show that the open-bottomed upper-sidewall/roof portion of the large box-like structure that forms the cabin . . . well . . . that open-bottomed upper-sidewall/roof portion has a cut-out in the front wall. The cut-out is filled with a two-panel retractable closure (like a miniature garage door). This cut-out provides clearance in the collapsing open-bottomed upper-sidewall/roof portion for the hatchway when being retracted to the collapsed extreme.

The pass through hatchway comprises a security feature. The hatchway is permanently open, or openable to persons with the keys or unlocking devices. The hatchway allows permanent opportunity for persons to transit back and forth between the cabin and cab (provided as said, as long as they have the keys and/or unlocking device for any door thereto, and none shown).

For example, if the vehicle is parked overnight with cabin expanded to the fully expanded position, presumably the occupants are attempting sleep in the cabin. If however, there should develop a security threat, where the best response is to retreat, the pass through hatchway allows the following action. The occupants can evacuate out of the cabin and into the cab, start the vehicle, and begin to drive away:—or that is, away from danger, and presumptively to safety. While the vehicle is pulling away, the occupants can actuate the automatic actuation of the cabin, such that the cabin collapses to the fully collapsed state while the vehicle is underway.

Figure 12:
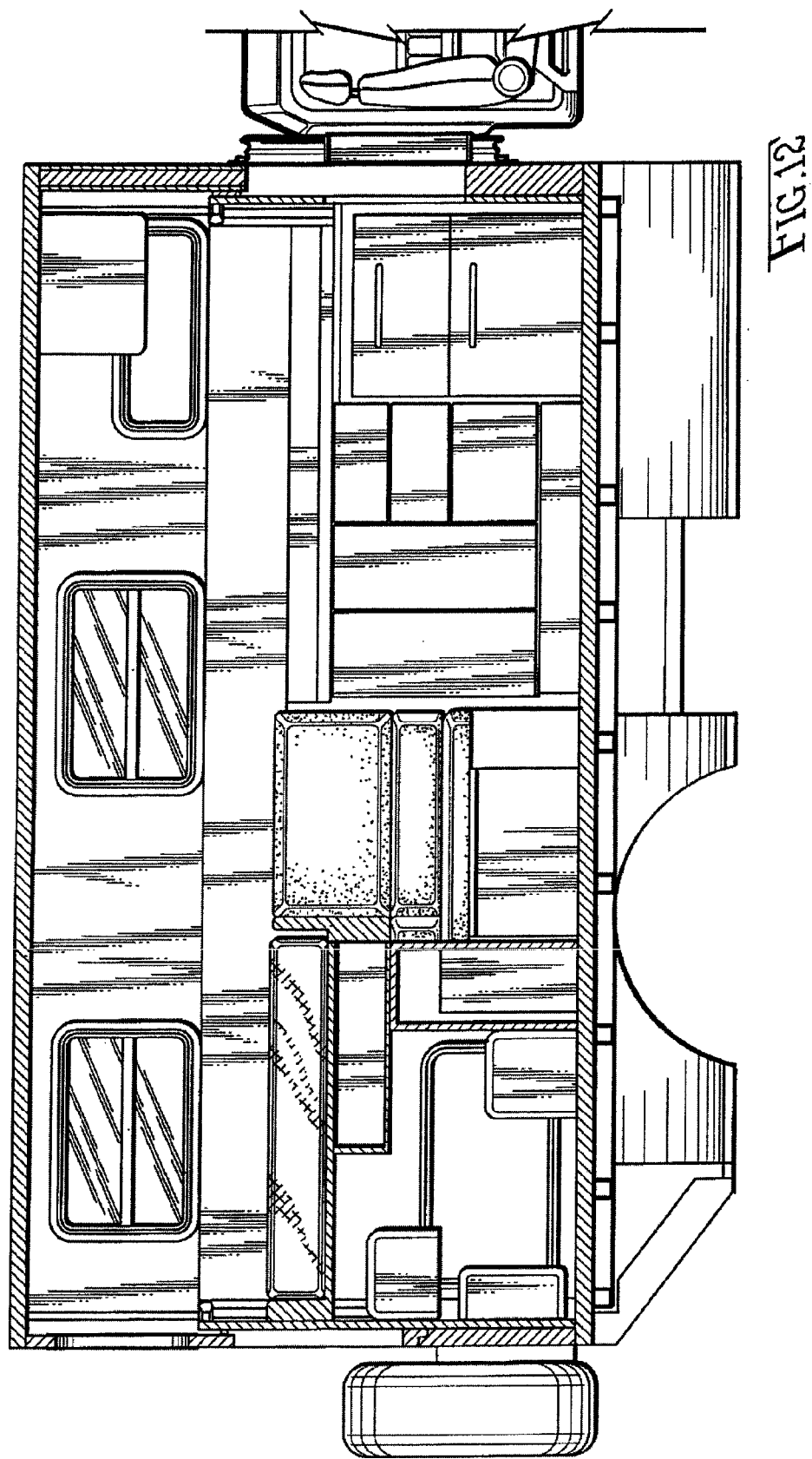
FIG. 12 is a section view comparable to FIG. 11 except showing the cabin expanded.

With reference to FIG. 12, A skylight in the roof allows occupants to get out of the cabin even when the cabin is collapsed.

A hatch is provided on an shelf (eg., bed surface) above the rear utilities and storage compartment to allow an occupant in the cabin, even when the cabin is collapsed, to wiggle through the hatch into the utilities compartment, and then from there, wiggle through another access opening out through the rear of the cabin. That way, if the vehicle has been parked inside a cargo container, where none of the doors can open, and the cabin is collapsed, any occupant therein is not trapped, but can manage an exit therefrom.

The air conditioning is mounted in the rear lower utilities compartment, as well as anything else typically mounted on the roof of a camper. The idea is, to keep the roof free of structure that would not allow the vehicle to fit inside a cargo container.

With general reference to FIGS. 8-13, the sidewalls are preferably a composite structure of FRP skins bonded on a dense foam core. The seals between telescopic sidewall sections are a form of a wiper seal.

Sliding surfaces preferably made from UHMW polymeric material or the like, with very low coefficient of friction and thereby reduce sticking. Preferably there are four (4) or so vertical strips on each side and each end.

Figure 19:
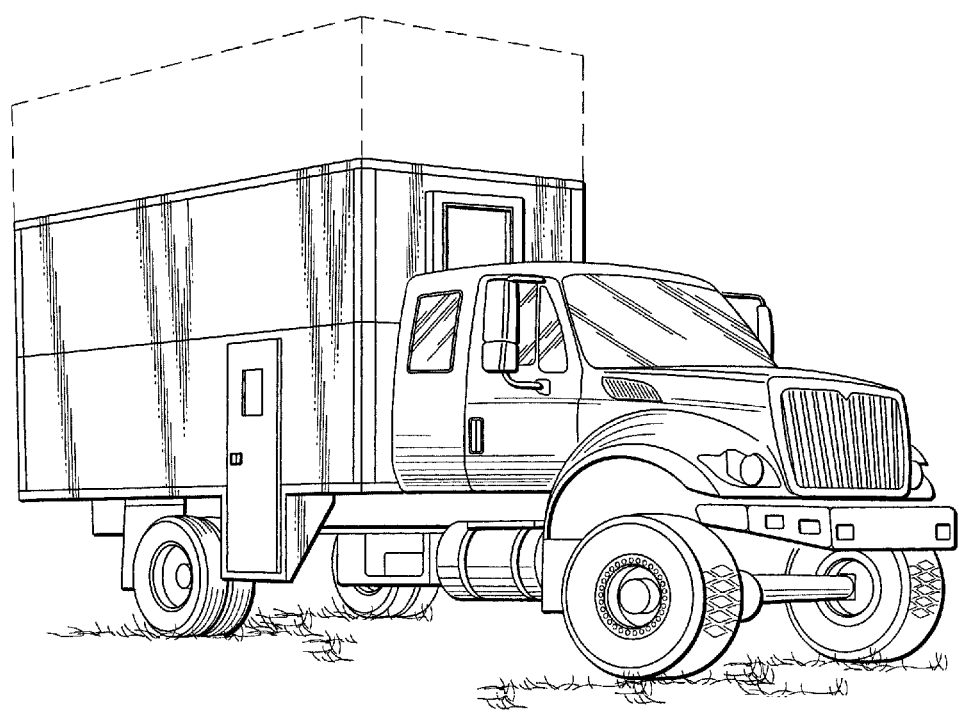
FIG. 19 is a perspective view comparable to FIG. 2 except of an alternate embodiment of an expedition vehicle in accordance with the invention, and with the cabin expanded vertically into an extreme expanded position.
Figure 20:
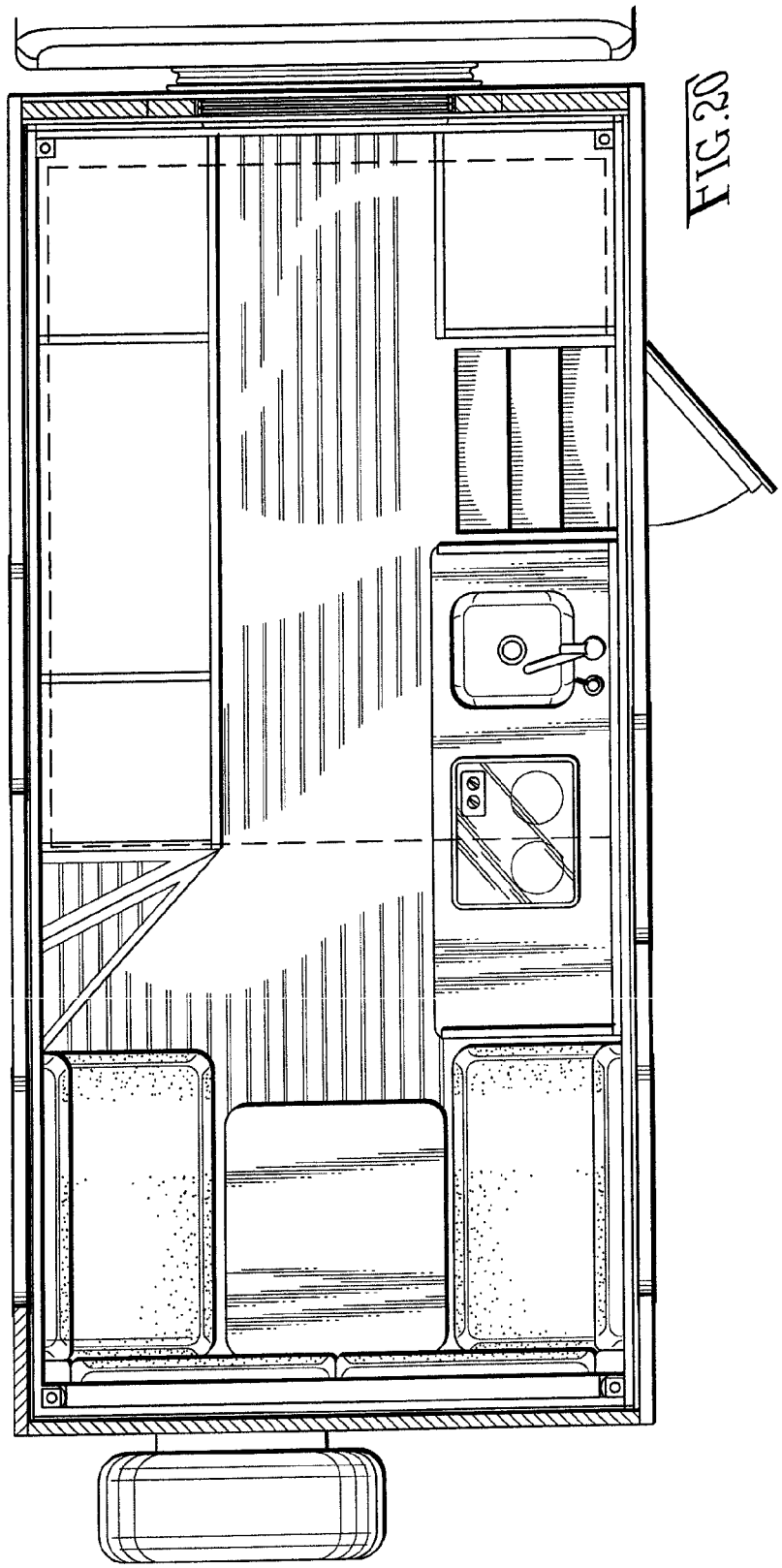
FIG. 20 is plan view of the cabin in FIG. 19 and comparable to the plan view of FIG. 8 in that the open-bottomed upper-sidewall/roof portion removed from view.
Figure 21:
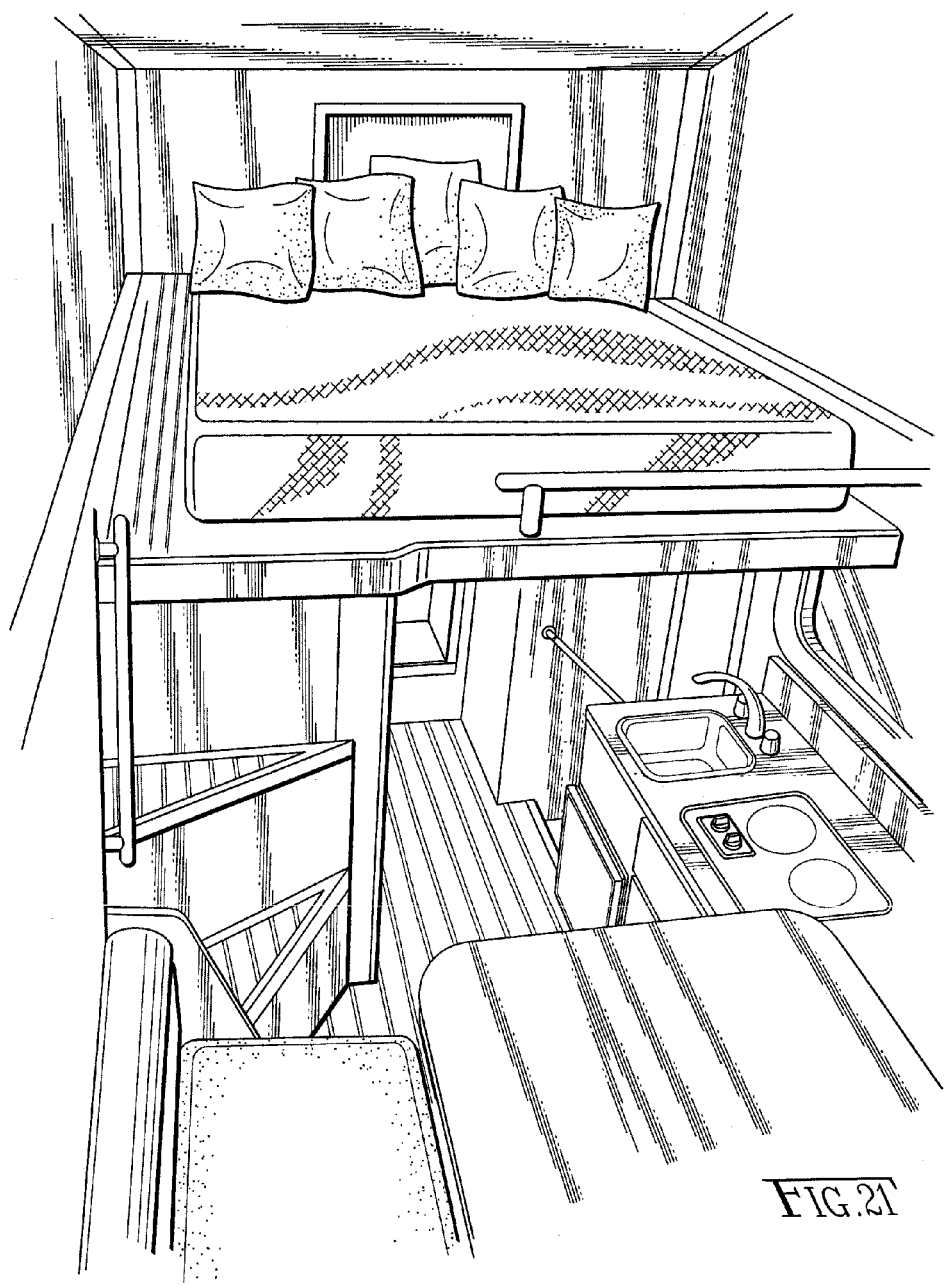
FIG. 21 is an enlarged scale perspective view from inside the cabin, and comparable to FIG. 14 except that, while the door to the water closet is partially in view, more significantly

Contrasting FIG. 12 to FIG. 21, one or more bed platforms can formed on and/or mounted from either (1) open-topped lower-sidewall/floor portion (shown in both FIGS. 12 and 21) and/or (2) open-bottomed upper-sidewall/roof portion (only shown in FIG. 21).

Figure 13:
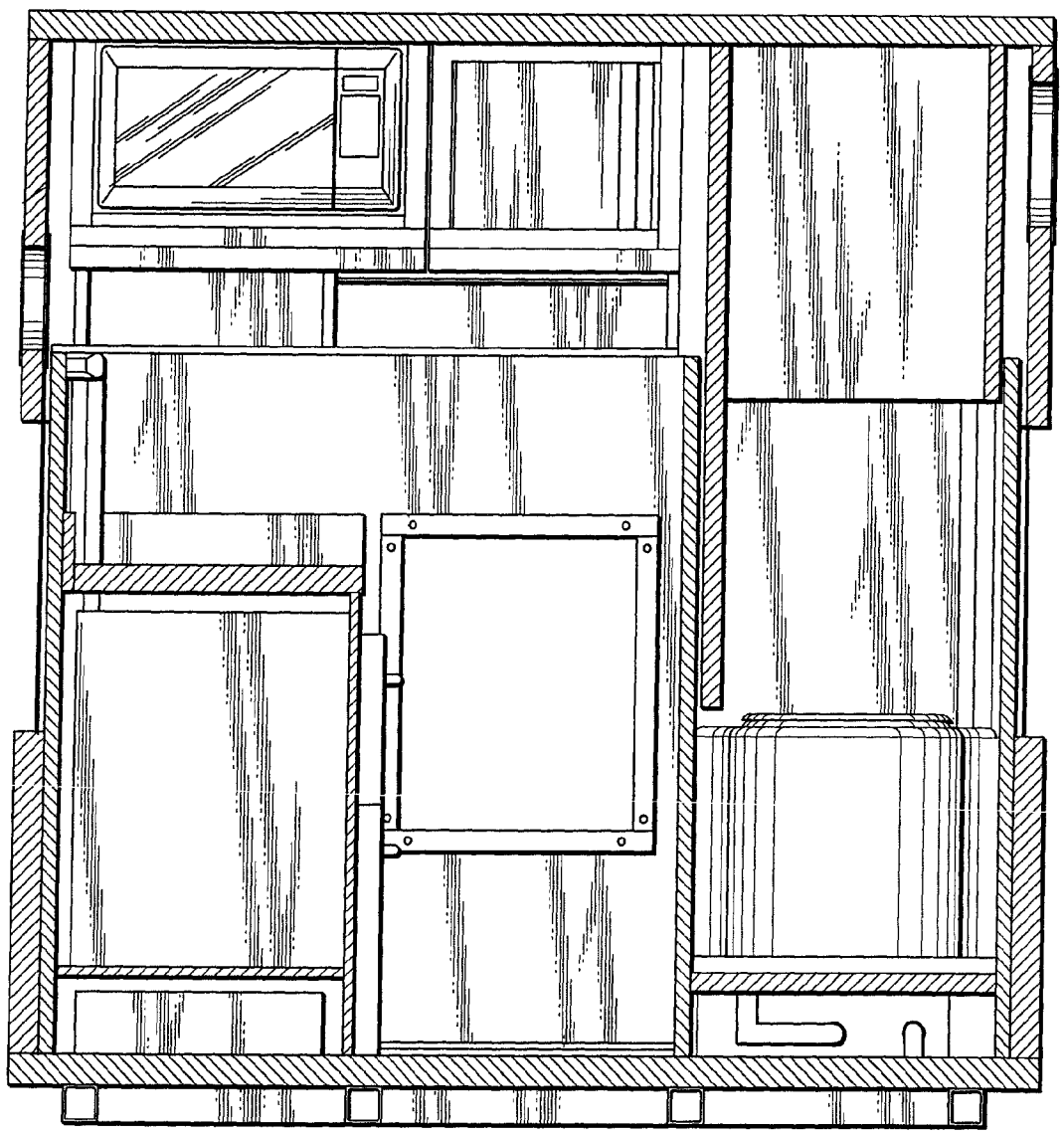
FIG. 13 is an enlarged scale section view taken along line XIII-XIII in FIG. 8.

FIGS. 13 and 21 show better (among other views) that cabinet structures, TV's and/or microwaves can be hung from the extendible open-bottomed upper-sidewall/roof portion of the cabin. Such accessories hung from the roof will be spaced away from the sidewalls to allow the intermediate hoops to just pass inside the clearance therefor. Likewise, other suspended articles like blinds are also spaced with a clearance gap for the same purpose.

Figure 14:
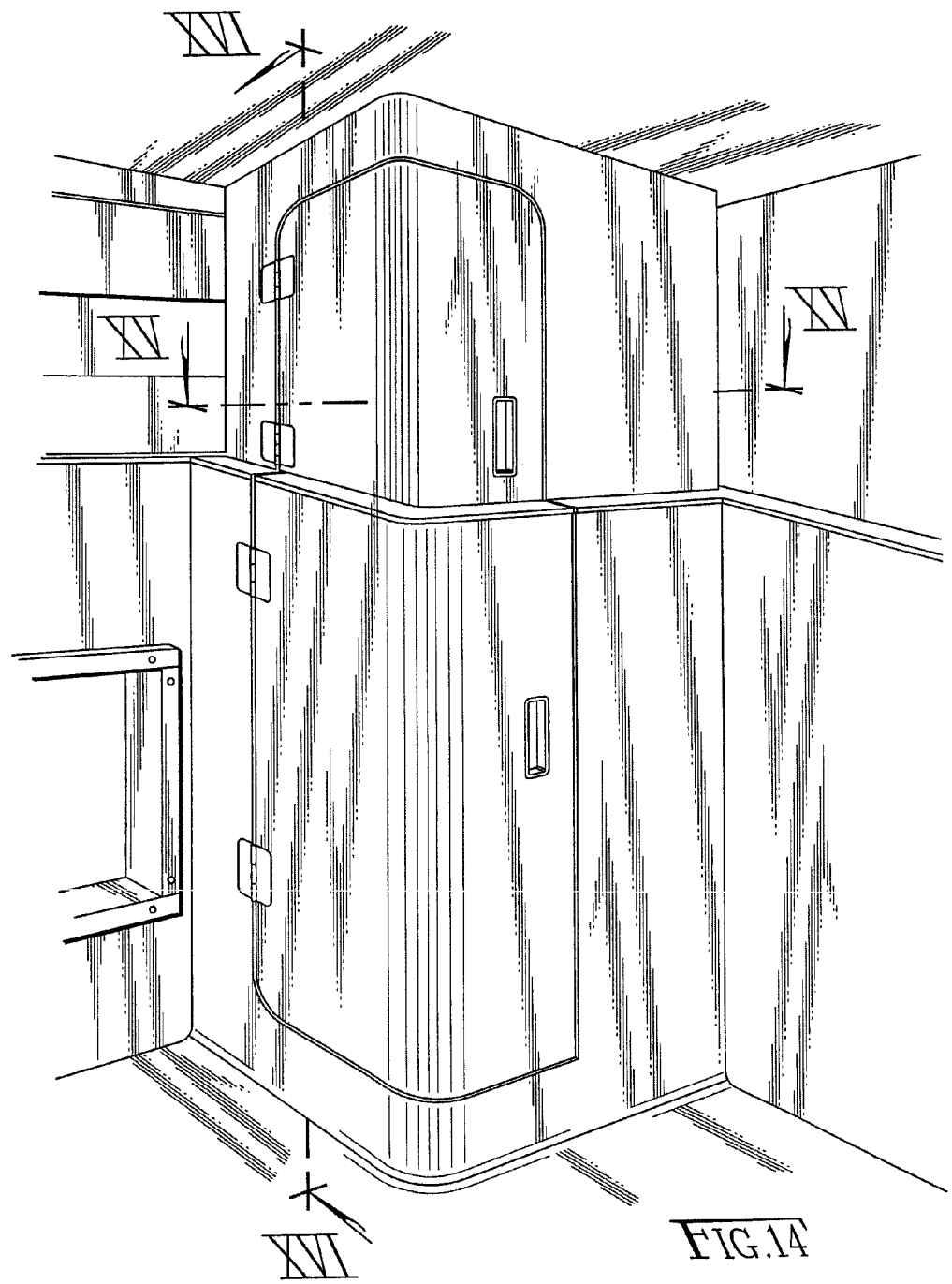
FIG. 14 is an enlarged scale perspective view from inside the cabin of the door to the water closet indicated in FIG. 13.
Figure 15:
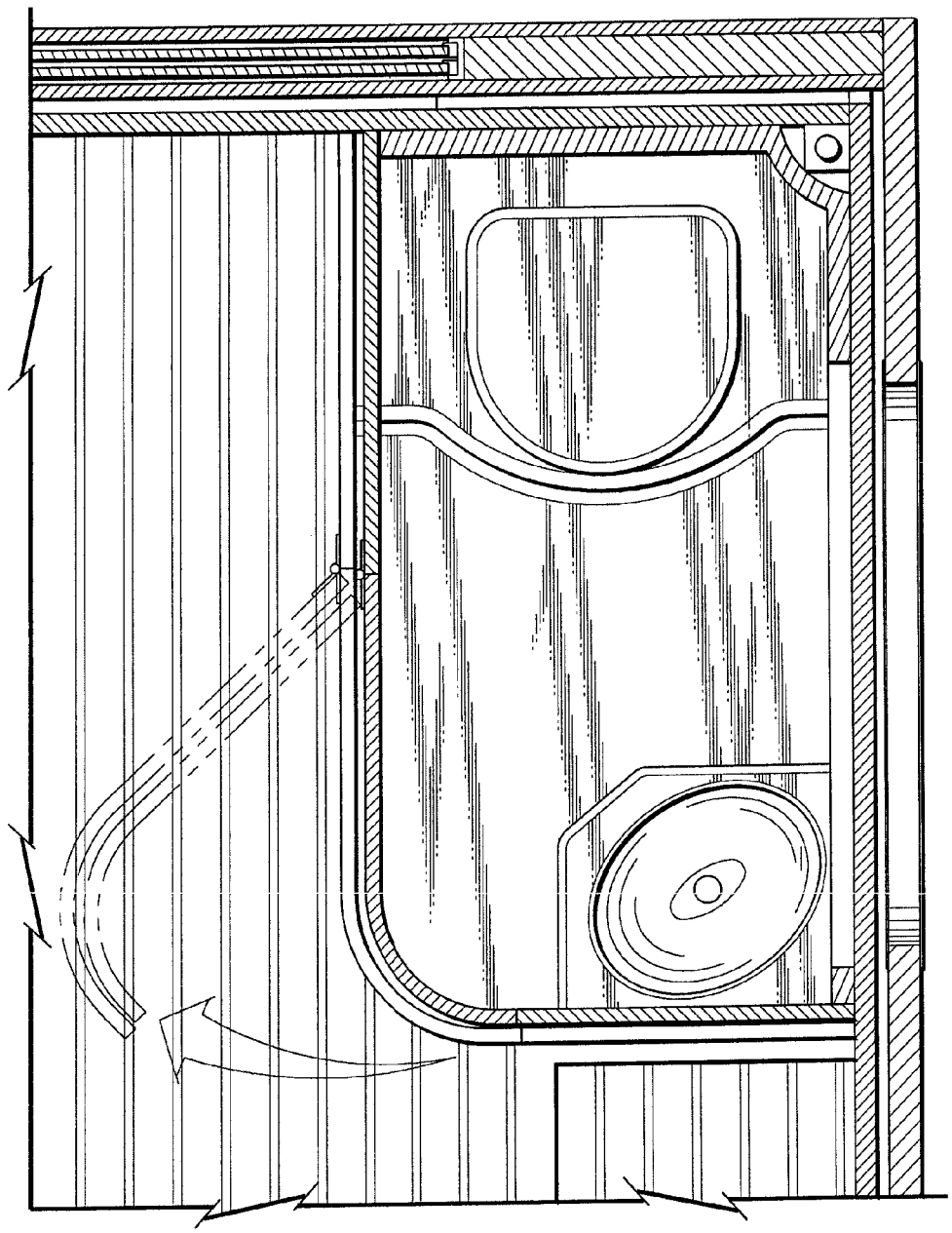
FIG. 15 is an enlarged scale section view taken along line XV-XV in FIG. 14.
Figure 16:
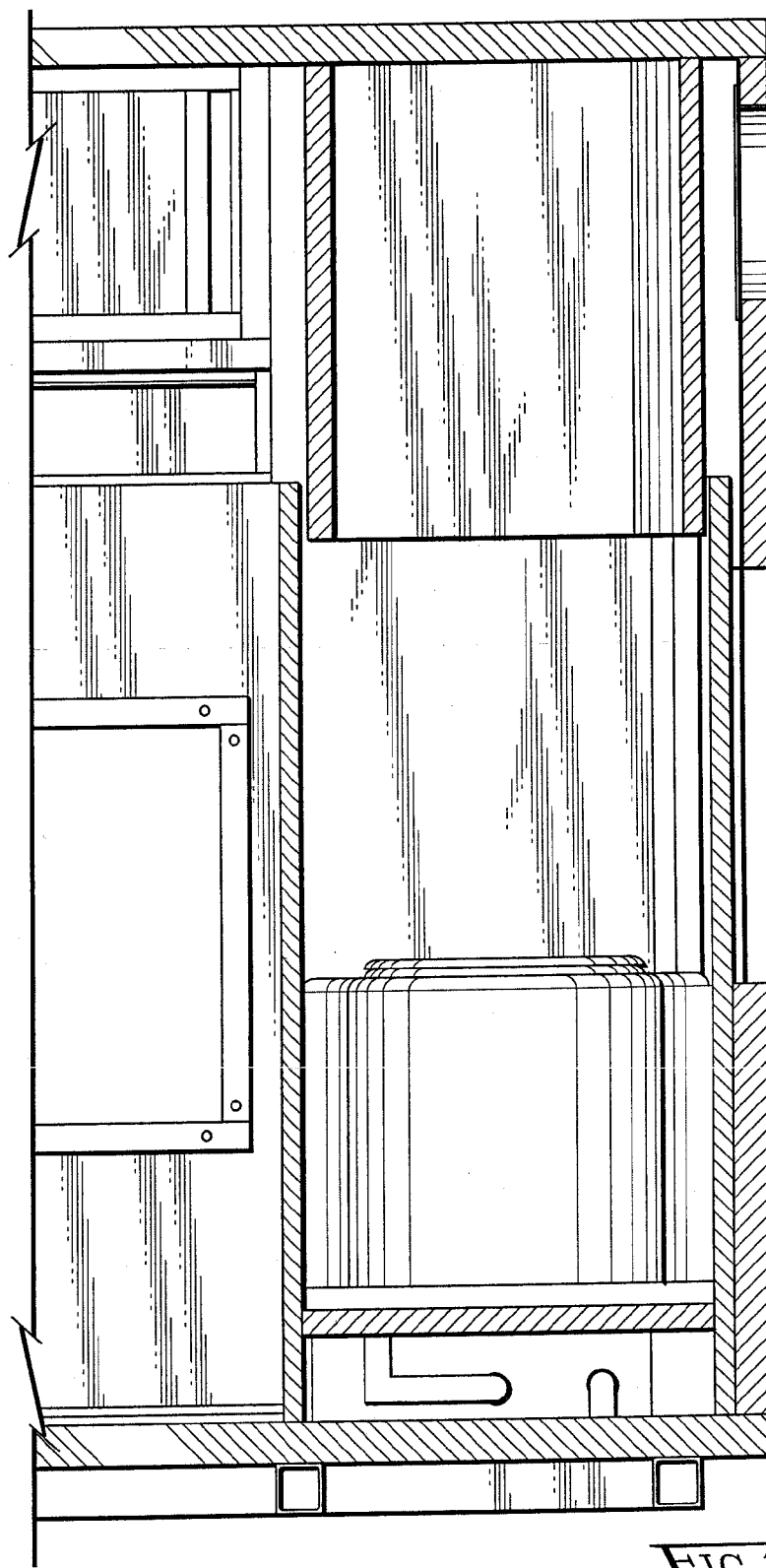
FIG. 16 is an enlarged scale section view taken along line XVI-XVI in FIG. 14.

FIGS. 14-16 show better that the cabin interior can include an interior room, such as a shower/bathroom (eg., water closet). The door therefor has several features:— it is partitioned into upper and lower panels,
the upper panel travels up and down in retraction and extension stroke co-planar inside the stationary lower panel,
the two panels have separate hinge axes which are offset relative to each other,
the panels are actually curved,
the upper panel's outer edge at the outside of the curve travels horizontally away from the counterpart outer edge in the lower panel which the door is OPENED, and does the opposite when the door is CLOSED.

The main door into and out of the cabin likewise comprises a two-panel system as well.

It is a design preference in accordance with the invention that the time for the cabin to actuate from the fully expanded state to the fully collapsed state comprises about thirty seconds (about a half of a minute). It is a further design preference that the cabin can do this while the vehicle is speeding at speeds of sixty miles per hour or so (eg., approximately one hundred kilometers per hour).

Given the foregoing, the sleeping occupants are spared the risk of having to evacuate the cabin by first stepping outside into the night air before they can safely retreat into the cab of the vehicle.

Figure 17:
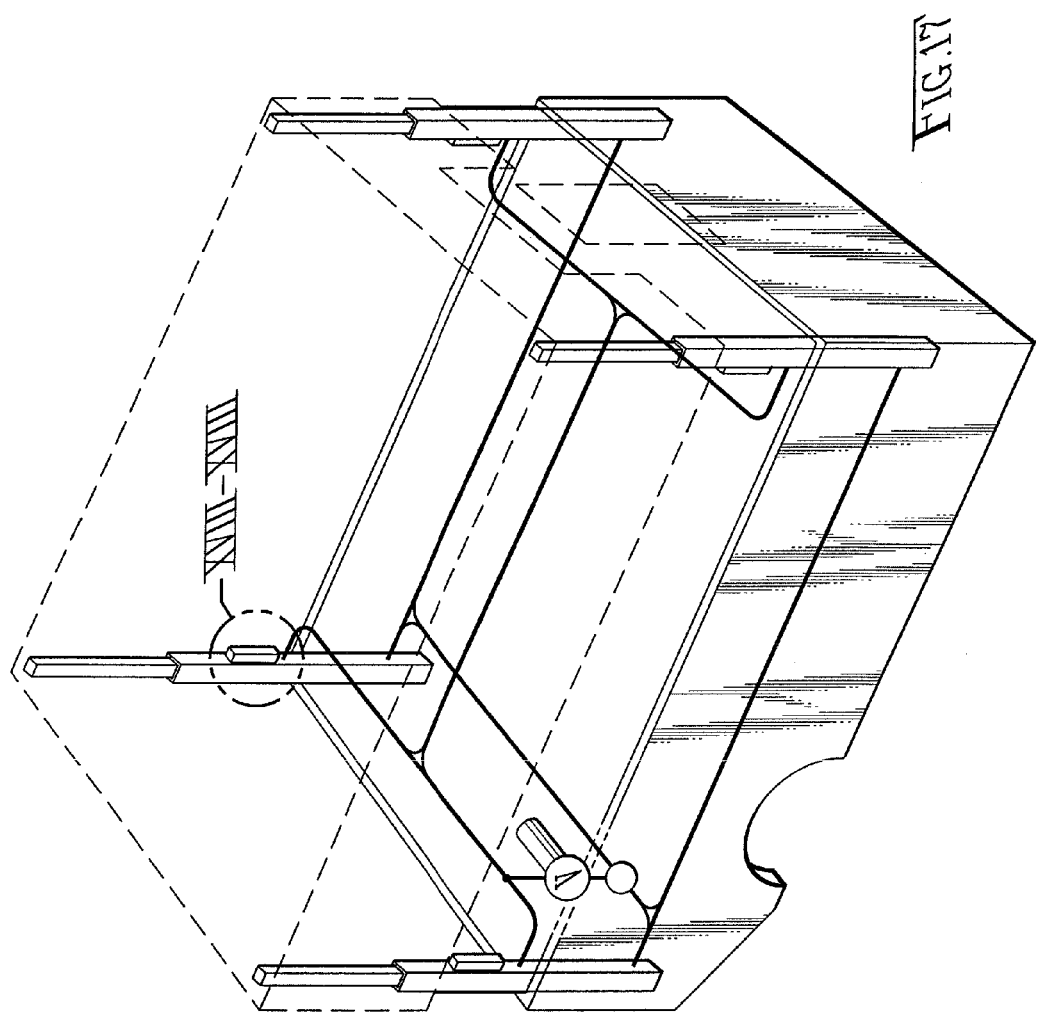
FIG. 17 is an enlarged scale perspective view of the cabin in isolation, and in the expanded state, and also with the open-bottomed upper-sidewall/roof portion of the cabin shown in dashed lines.

FIG. 17 shows better that, to keep the upper-sidewall/roof portion and any intermediate wall portions on track during the extension and retraction strokes, the cabin will at least 4 hydraulic actuators/slide-rods in the corners of the cabin, perhaps 6 slide rods for larger cabins. FIG. 17 also shows that there is a compensation system so that all of the hydraulic cylinders operate in unison. Otherwise, without such a system, it is hard to avoid one cylinder or more from binding to halt when the vehicle is parked such that cabin is listing a little bit. Electric service has to be managed from the lower-sidewall/floor portion to the upper-sidewall/roof portion by extensible lines such as coiled lines, or saggy lines pulled taut by springs and the like.

Figure 18:
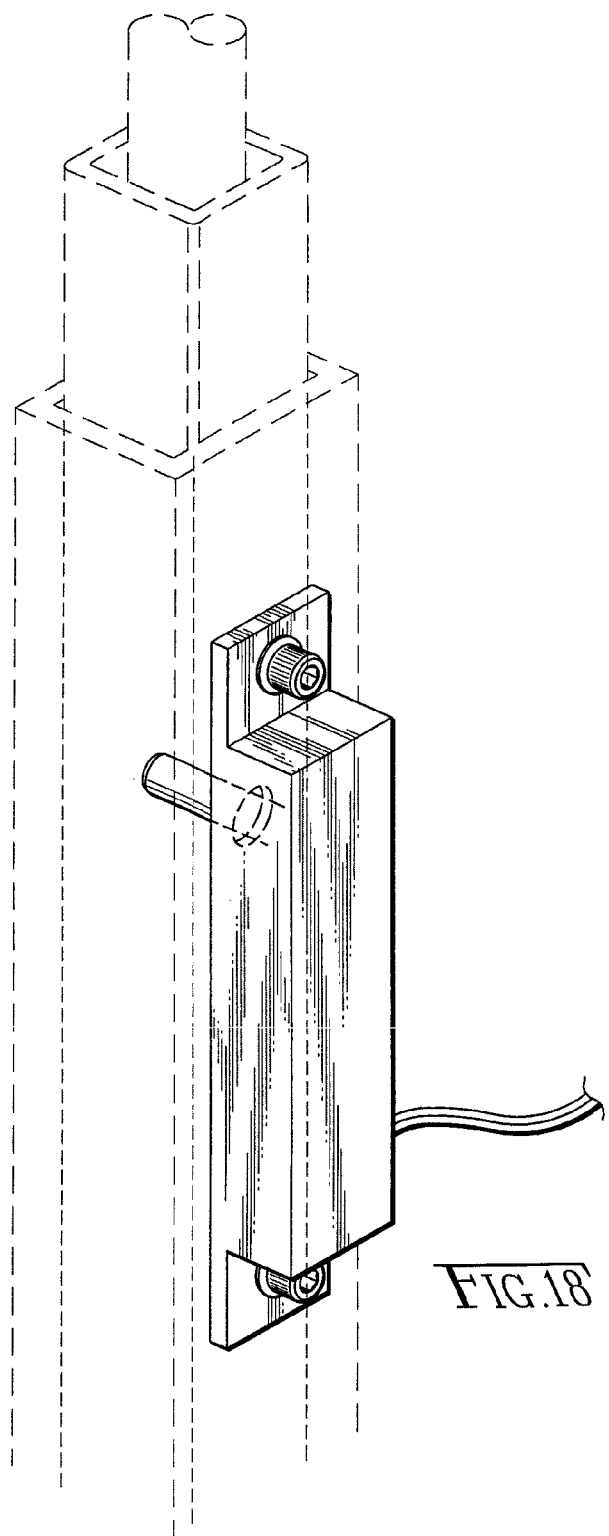
FIG. 18 is an enlarged scale perspective view of detail XVIII-XVIII in FIG. 17.

FIG. 17 show the hydraulic cylinders driven to their upper extreme extension position. FIG. 18 shows a safety provision. A locking pin is spring biased to extend past a notch in the rod of the hydraulic cylinders (or into a index hole for pin, and not shown). Hence the spring biased pin is biased to slide against the sidewall of inner rod while inner rod is driven to inner rod's upper extreme. As soon as inner rod's bottom or index hole slides past spring-biased pin, pin moves over further underneath the bottom of rod (or into an index hole therefor, and not shown). That way, sliding pin provides an automatic and power-free safety lock for retaining the inner rod in its upper extreme.

When a user wants to compress the telescoped inner rod back into the hydraulic cylinders, preferably the user powers up the electric utilities for the vehicle (or otherwise turns the electric service ON), switches ON the relays (relays not shown) for bleeding the hydraulics (or forcibly de-elevating the inner rod). On the same circuit as the relays being switched ON, there is a linear actuator solenoid which thrusts the pin to the unlocked position, allowing the inner post clearance to de-elevate past by the pin.

As soon as the inner rod is compressed to its retracted extreme, the power to the solenoid can be switched OFF. The pin is allow to ride against the inner rod's sidewall by means of the spring biasing. The pin will automatically provide a lock under the inner rod (or into an index hole therefor) on the next cycle the inner rod is elevated, and without electric power or any other prime mover.

Returning again to FIGS. 8-12, it is an additional aspect of the invention that the cabin include a tailgate. Among other uses of the tailgate, if the vehicle is driven cab forward into a shipping container (not shown), as typical for cargo ship shipping to oversea ports, the driver can quit the vehicle by crawling through the pass through hatchway, make his way to the back of the cabin, and squirm out the tailgate. Otherwise, the container sidewalls would block the cab doors from opening, and thereby lock the driver in the cab for good. But with the tailgate, the driver can drive in, and worm his way backwards until he emerges out of the tailgate.

FIGS. 19-21 shown an alternate embodiment of an expansible cabin. The FIGS. 1-18 cabin had a single telescopic section. This cabin of FIGS. 19-21 has a multiplicity of telescopic sections such that a fully expanded state for this cabin might be two or three times higher than the FIGS. 1-18 cabin.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. Apparatus for a motor vehicle, comprising:
a camper comprising a living enclosure;
wherein the camper is expandable and collapsible between expanded and collapsed extremes, and has a vertically telescopic structure;
the camper interior is provided with an interior partition provided with a door; and
said door:—
is partitioned into upper and lower panels,
the upper panel travels coplanar one side or the other during retraction and extension stroke co-planar relative the lower panel, and
the two panels have separate hinge axes which are offset relative to each other.

2. The apparatus of claim 1, wherein:
the camper has a vertically telescopic, rectangular box structure comprising:—
a rigid rectangular and open-topped lower-sidewall/floor portion,
a rigid rectangular and open-bottomed upper-sidewall/roof portion, and
zero or more rigid rectangular-hoop shaped, intermediate sidewall sections.

3. The apparatus of claim 2, wherein:
said vertically telescopic, rectangular box structure comprises at least one or more rectangular-hoop shaped, intermediate sidewall sections intermediate between the rectangular and open-topped lower-sidewall/floor portion and the rectangular and open-bottomed upper-sidewall/roof portion.

4. The apparatus of claim 3, wherein:
open-topped lower-sidewall/floor portion is stationary during expansion and collapsing strokes, while the open-bottomed upper-sidewall/roof portion and open-bottomed upper-sidewall/roof portion cycle between vertical extremes.

5. The apparatus of claim 2, wherein:

the open-bottomed upper-sidewall/roof portion of the camper's vertically telescopic, rectangular box structure is formed with a cut-out in a front sidewall thereof; and further comprising a retractable closure for said cut-out in said front sidewall of said open-bottomed upper-sidewall/roof portion of the camper's vertically telescopic, rectangular box structure;

said retractable closure being operable to keep the cut-out permanently OPEN as well as sized to about the same size independent of whether the camper is expanded or collapsed.

6. The apparatus of claim 5, wherein:

said retractable enclosure is formed by a plural panel retractable enclosure design.

7. The apparatus of claim 1, wherein:

said door are curved, and the upper panel's outer edge at the outside of the curve travels horizontally away from the counterpart outer edge in the lower panel when the door is OPENED, and does the opposite when the door is CLOSED.

8. The apparatus for a motor vehicle, comprising:

a camper comprising a living enclosure;

wherein the camper is expandable and collapsible between expanded and collapsed extremes, and has a vertically telescopic, rectangular box structure comprising:— a rigid rectangular and open-topped lower-sidewall/floor portion, a rigid rectangular and open-bottomed upper-sidewall/roof portion, and zero or more rigid rectangular-hoop shaped, intermediate sidewall sections; and at least one bed platform suspended from and living enclosure interior space defined by the open-bottomed upper-sidewall/roof portion of the camper.

9. The apparatus of claim 8, further comprising:

another bed platform mounted to and living enclosure space defined by the open-topped lower-sidewall/floor portion of the camper, wherein the two living areas are traversed by a spiral staircase.

\* \* \* \* \*